June 2, 1925.
J. A. BERNINGHAUS
DIRIGIBLE HEADLIGHT
Filed Jan. 21, 1922
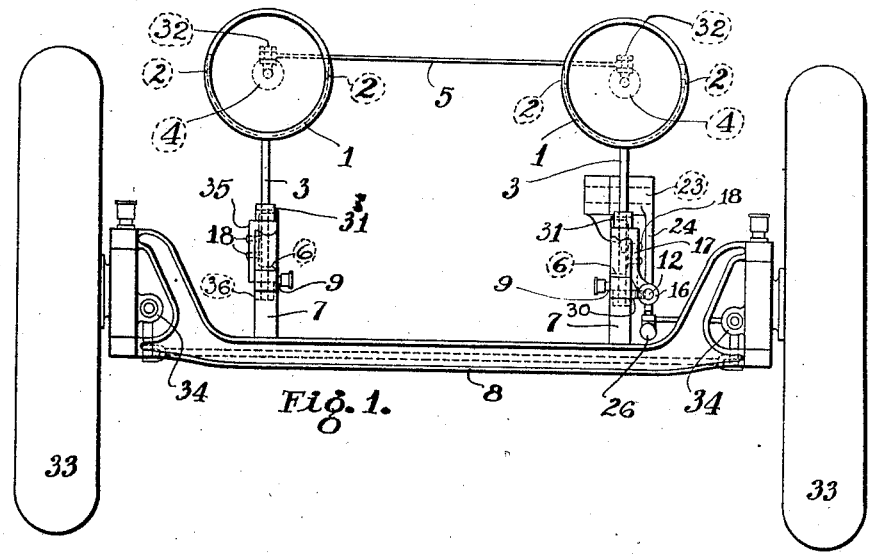
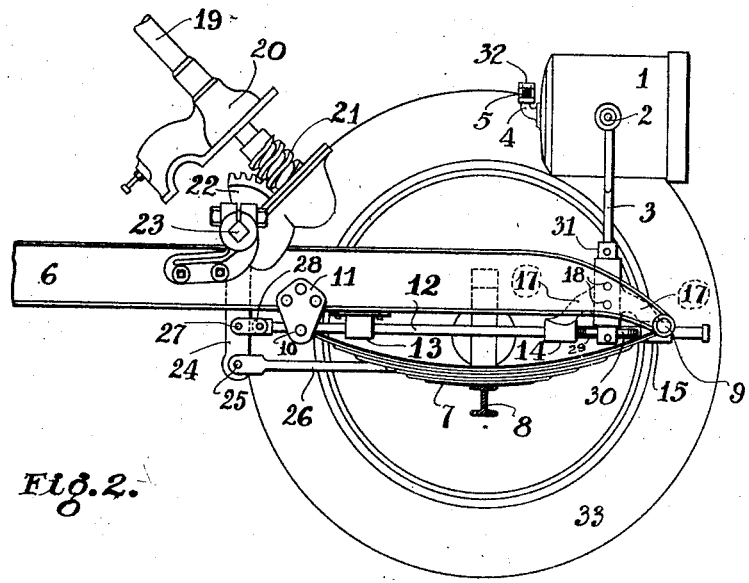
Inventor:
Julius A. Berninghaus,
by Hugh K. Wagner, atty.

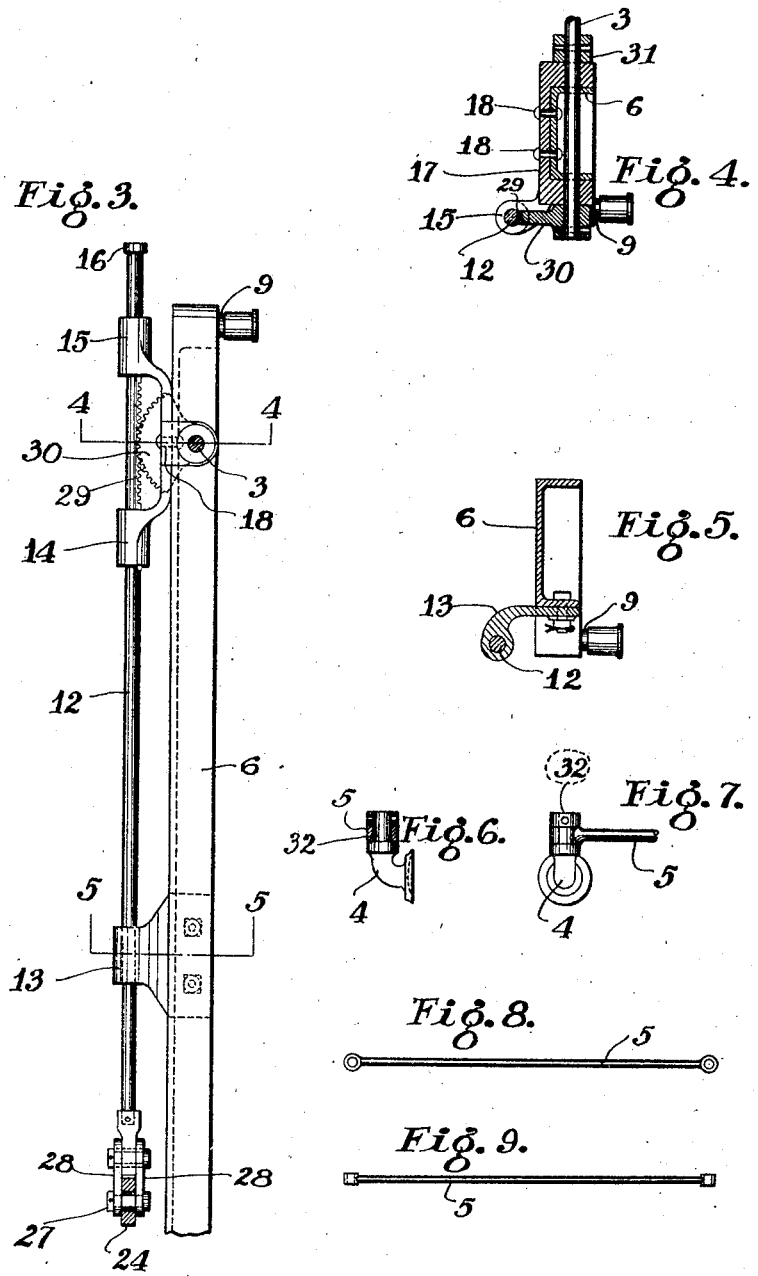

Patented June 2, 1925.

1,540,309

UNITED STATES PATENT OFFICE.

JULIUS A. BERNINGHAUS, OF ST. LOUIS, MISSOURI.

DIRIGIBLE HEADLIGHT.

Application filed January 21, 1922. Serial No. 530,763.

*To all whom it may concern:*

Be it known that I, JULIUS A. BERNINGHAUS, a citizen of the United States, residing at the city of St. Louis, State of Missouri, have invented certain new and useful Improvements in Dirigible Headlights, of which the following is a specification.

This invention provides means for steering the headlights of a motor vehicle simultaneously with the turning of the steering wheel and post, so that when the front wheels of an automobile are turned to the left so as to follow a turn in the road, the direction of the illumination from the lamps will follow the direction of the wheels and the direction in which the car is turning, instead of shooting off at a tangent, as is now customary. Likewise, when a car turns to the right the light will follow the new path of the car instead of shooting off at a left-hand tangent.

In the accompanying drawings forming part of this specification, in which like numbers of reference denote like parts wherever they occur, Figure 1 is a front elevation;

Figure 2 is a side elevation;

Figure 3 is a plan view;

Figure 4 is a sectional view taken on the line 4—4 in Figure 3, looking in the direction indicated by the arrows;

Figure 5 is a sectional view on the line 5—5 in Figure 3, looking in the direction indicated by the arrows;

Figures 6 and 7 are detailed views of the lamp mounting and connecting means;

Figure 8 is a top plan view of the rod connecting the lamps; and

Figure 9 is an elevation showing the said rod.

The lamps 1 may be of any ordinary or desired construction. They will be attached by pivots 2 to rods 3 in the usual manner.

On the back of the casing of each lamp 1 will be fixed a bracket 4 containing or bearing means for connection therewith of rod 5, which extends from one bracket 4 to the other, whereby the two lamps 1 are maintained in fixed relation to each other, so that they move simultaneously.

Rods 3 are connected indirectly to the chassis 6, and thus the lamps 1 are supported.

The leaf springs 7 rest upon the T-beam 8, and are pivoted at 9 to the forward end of the chassis and at 10 to brackets 11.

Rod 12 is supported by bearings 13, 14, and 15, and is pivoted at its forward end with a shoulder 16 to limit its travel. Bearings 14 and 15 are formed in the branches of a casting 17 secured by rivets 18 or other suitable means to the chassis 6.

When the steering wheel (not shown in the drawings) is turned, it operates the steering post 19 which passes through hood 20. In Figure 2 hood 20 has been so withdrawn as to uncover worm 21 and sector 22, which, however, are normally covered by hood 20. When post 19 is rotated in one direction (say, to the left), it turns worm 21 in one direction, corresponding thereto, and rocks sector 22 in a certain direction; but when steering post 19 is rotated in the opposite direction worm 21 is turned in a correspondingly-opposite direction and sector 22 is rocked correspondingly opposite.

Sector 22 is fixed to shaft 23, and is adapted to rock the same in either direction. Rock arm 24 is also fixed to shaft 23 and moves forward or backward, according to the direction in which shaft 23 is rocked.

At 25 on arm 24 one end of rod 26 is pivoted.

Rod 12 is also pivoted to arm 24 at 27 by toggle joint 28.

A rack 29 is formed in the forward part of rod 12 and meshes with a sector 30 fixed to rod 3, which passes through a sleeve in casting 17 and through stud 31, and is adapted to rotate in the said sleeve. When rack 29 moves in one direction, corresponding movement of sector 30 causes consequent rotation of rods 3, and therewith lamps 1. Movement of rack 29 in the opposite direction reverses the direction of movement of the lamps 1. Intermediate position of rack 29 causes the lamps 1 to direct their light straight ahead.

Figure 4 with great clearness shows the way in which rods 3 are rotatably mounted in casting 17 and with relation to sector 30, and the relation of the latter to rod 12, bearing rack 29.

Since lamps 1 are bound together by rod 5, swiveled on stud 32 of brackets 4 and as each rod 3 is rotatable in either direction by the longitudinal movement of rod 12, it is evident that a cheap, simple, strong, efficient, and positive means for providing dirigibility of the headlights 1 from worm 21 and post 19 is herein provided.

Inasmuch as the wheels 33 are also steered by the post 19, it is evident that by this construction the lights must be steered synchronously with the wheels.

Rod 26 not only supports rod 24 but communicates steering direction therefrom to the steering knuckles 34, to which rod 26 is attached.

Casting 35 on one side of the machine substitutes for casting 17 on the other, and rod 3 rotates in an opening therein like on the other side in casting 17. Nut 36 prevents rod 3 from rising or pulling through casting 35.

Having thus described this invention, I hereby reserve the benefit of all changes in form, arrangement, order, or use of parts, as it is evident that many minor changes may be made therein without departing from the spirit of this invention or the scope of the following claim.

I claim:

The combination with the side frame members and the steering shaft rock arm of an automobile; of a bracket having a channel shaped body portion having its web vertical and its flanges horizontal and embracing the forward portion of one of the side frame members, said flanges being provided with vertically alined bearings and the frame member having openings in its flanges alined with said bearings, said bracket further having a pair of arms extending respectively forwardly and rearwardly from the lower end of the body and provided at their extremities with depending and laterally extending horizontally alined bearing portions, a lamp supporting shaft journalled in the body bearings and extending through said openings, a segmental gear on the lower end of said shaft, a rod extending through the horizontal bearing and provided with a rack portion meshing with the gear, and a connection between said rod and arm.

In testimony whereof I hereunto affix my signature.

JULIUS A. BERNINGHAUS.